J. H. GRAVELL.
METHOD OF SECURING PLATES.
APPLICATION FILED JULY 26, 1918.
1,330,800.
Patented Feb. 17, 1920.
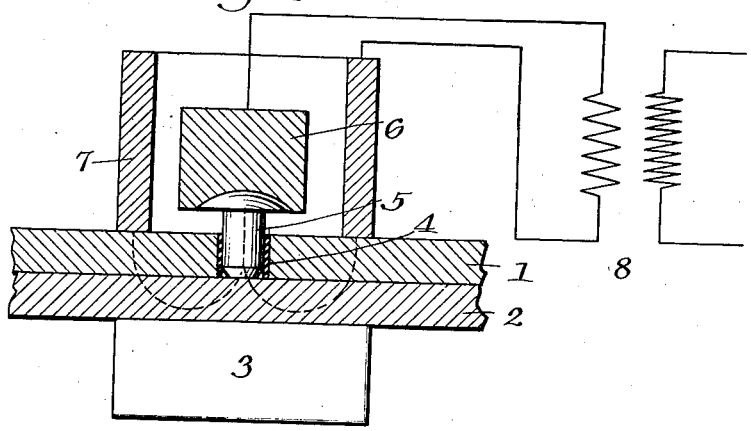
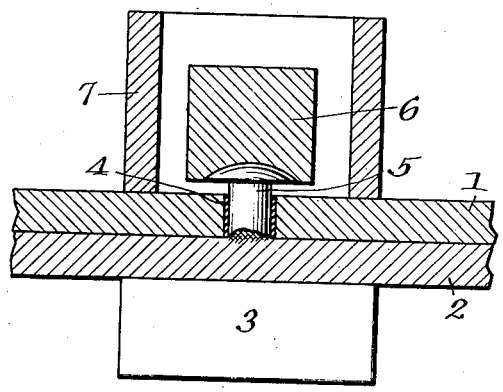
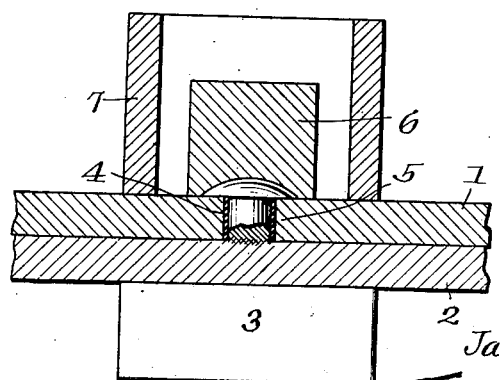
INVENTOR
James H. Gravell
BY
Townsend & Decker
ATTORNEYS

UNITED STATES PATENT OFFICE.

JAMES H. GRAVELL, OF BROOKLYN, NEW YORK, ASSIGNOR TO THOMSON SPOT WELDER COMPANY, OF BOSTON, MASSACHUSETTS, A CORPORATION OF MASSACHUSETTS.

METHOD OF SECURING PLATES.

1,330,800.      Specification of Letters Patent.      Patented Feb. 17, 1920.

Application filed July 26, 1918. Serial No. 246,827.

*To all whom it may concern:*

Be it known that I, JAMES H. GRAVELL, a citizen of the United States, and a resident of Brooklyn, in the county of Kings and State of New York, have invented certain new and useful Improvements in Methods of Securing Plates, of which the following is a specification.

This invention relates to securing heavy plates together by means of an auxiliary member such as a rivet or slug electrically welded in place to join the plates to each other.

The invention is particularly useful in joining the plates in large structures such as steel ships as in such work there is a great advantage in electrically operating from one side of the work only, as when the electric current is obliged to span the plates, a very long circuit and relatively high voltage is necessarily required. It is the object of this invention to avoid the objections arising from long circuits spanning the work, by providing a very short electrical circuit on one side of the work and applying all the current from this side.

To accomplish this and to insure that the rivet will become sufficiently heated to weld to the plate farthest removed from the electric contacts, I insulate the rivet from the first plate through which it passes and thereby compel the current to flow into the second plate and to the contacting rivet end.

The invention consists in the method of joining plates to each other hereinafter more particularly described and then set forth in the claims.

In the accompanying drawings, Figure 1 is a diagrammatic view showing the parts in assembled relation to be joined in accordance with this invention.

Fig. 2 is a similar view showing a subsequent stage in the process.

Fig. 3 is a similar view showing the finished joint.

The plates 1 and 2 to be secured together are superposed on each other against a block 3. The plate 1 is provided with a perforation at each place it is desired to secure it to the plate 2.

According to one of the ways of carrying the invention into practice, the perforation is lined with a thin layer of insulation such as mica, fiber, paper or any other suitable material 4. 5 indicates a rivet or slug preferably provided with an enlarged head and a tapered end. The end of the rivet is inserted in the insulated perforation in the plate 1 with its tapered end abutting against the surface of the plate 2.

6 indicates a current supplying block or electrode preferably provided with a cavity for the head of the rivet 5 and 7 indicates a coöperating current supplying electrode preferably of annular form and surrounding the block 6. The annular electrode seats on the outer surface of the plate 1 and also preferably acts as a pressure device for forcing the plates 1 and 2 together.

The electrodes 6 and 7 are connected to the terminals of the secondary of a transformer 8 and it will be noted that both these electrodes are by preference located on the perforated plate side of the work. The block 3 merely supports the other side of the work and resists the pressure of the electrodes 6 and 7.

Upon closing the circuit the current flows from one electrode to the other and, owing to the insulating sleeve 4, in order to get from one to the other it must traverse the contact between the plate 2 and the tapered end of the rivet 5 as indicated in dotted lines in Fig. 1. This causes the end of the rivet as well as the metal of the plate 2 at the place of contact to become heated and softened and upon applying pressure to the rivet by means of the electrode 6 the softened metal becomes commingled and welded together, the current and pressure being preferably continued until the head of the rivet seats on the plate 1 as indicated in Fig. 3.

As the passage of current is but momentary it is immaterial whether the insulation 4 breaks down or not in the subsequent stages of the operation, it performs its function by compelling the first rush of current to flow as indicated. The insulation is very thin (it is shown greatly exaggerated in the drawings) and does not interfere with a tight joint between the sides of the rivet and the perforation in the plate 1 and in fact when paper or some such material is used it may entirely disappear in the later stages of the operation. The natural swelling of the rivet shank due to the heat and upsetting pressure perfectly fills the perforation.

It will be understood that the purpose of the invention is to insulate the rivet from the plate through which it passes so that the first rush of current will be compelled to pass through the abutted contact of the rivet end with the plate to which it is to be welded and this feature may be attained in any suitable manner other than providing an insulating sleeve as described.

What I claim as my invention is:—

1. The method of securing members together, consisting in perforating one of the members, inserting a rivet blank through said perforation and into contact with the imperforate member, applying current supplying contacts to one side only of the members, causing the current in flowing from one contact to the other to pass through the end of the rivet and applying pressure to weld the rivet to the imperforate plate.

2. The method of securing plates in superposed relation, consisting in perforating one of the plates, insulating the perforation, inserting a rivet blank through the insulated perforation and against the imperforate plate, applying current supplying blocks to one side of the members only and applying pressure to weld the rivet to the imperforate member.

3. The method of securing plates in superposed relation, consisting in perforating one of the plates, insulating the perforation, inserting a headed rivet in said insulated perforation with its end contacting with the imperforate plate and welding the end of the rivet to the imperforate plate by means of electrodes located on the perforated side of the plates only.

4. The method of securing superposed plates together by a rivet consisting in applying two current supplying terminals at one side of the plates, one of said terminals engaging the rivet and the other engaging the plate and insulating the rivet from said plates to cause the current to flow from one terminal to the other longitudinally through the rivet.

Signed at New York, in the county of New York and State of New York, this 25th day of July, A. D. 1918.

JAMES H. GRAVELL.

Witnesses:
F. B. TOWNSEND,
F. E. ROESLER.